Sept. 18, 1956     S. E. KIME     2,763,338
RELEASABLE SNUBBER FOR SEAT
Filed Nov. 3 1954
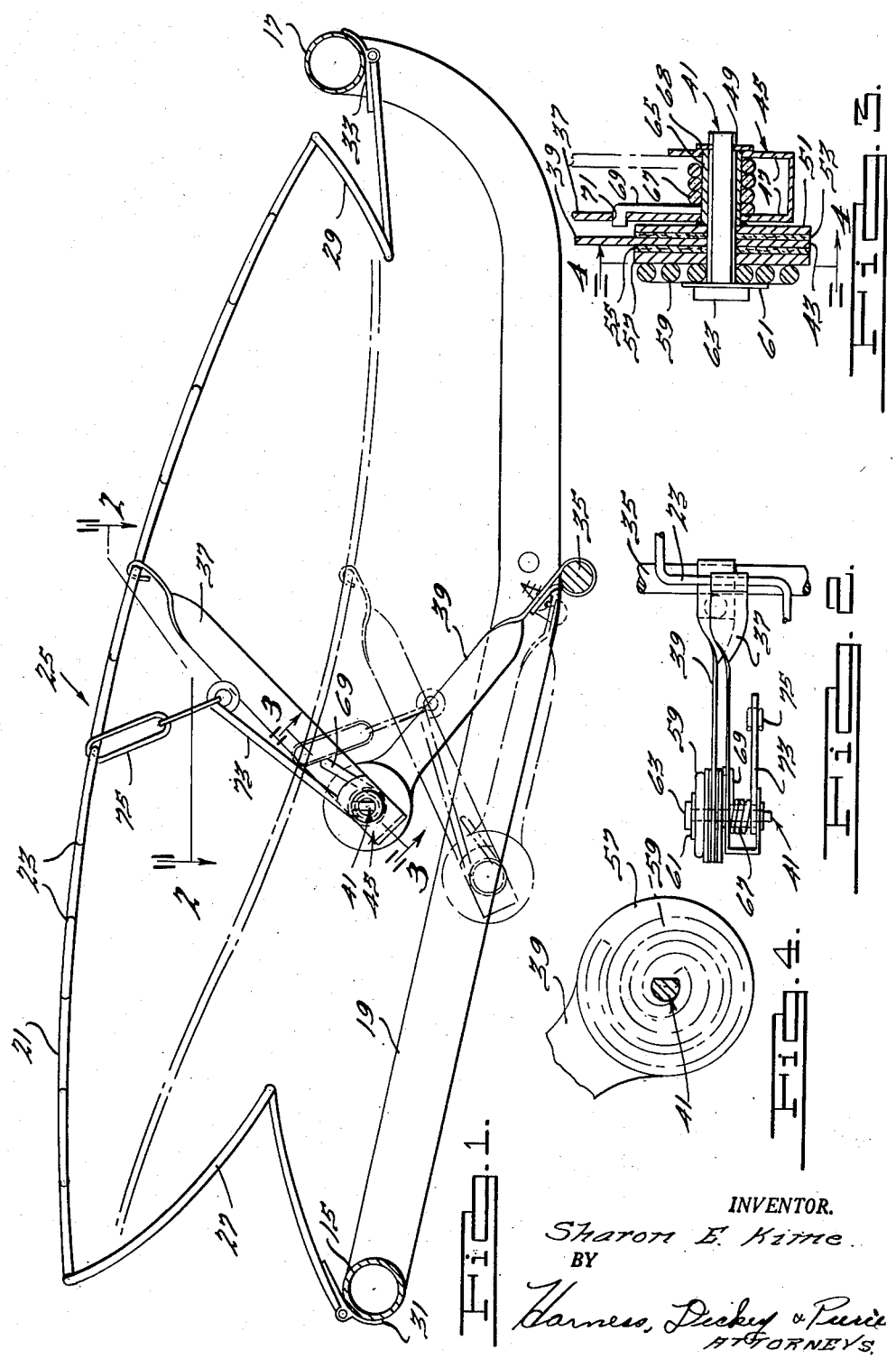
INVENTOR.
Sharon E. Kime
BY
Harness, Dickey & Pierce
ATTORNEYS.

United States Patent Office

2,763,338
Patented Sept. 18, 1956

2,763,338

RELEASABLE SNUBBER FOR SEAT

Sharon E. Kime, Detroit, Mich., assignor to American Metal Products Company, Detroit, Mich., a corporation of Michigan Application November 3, 1954, Serial No. 466,543

5 Claims. (Cl. 188—130)

This invention relates generally to a spring seat construction for motor vehicles and more particularly to a snubber for use in a spring seat construction to dampen the vibrations of the springs.

An object of the present invention is to provide a snubber for use in a motor vehicle seat construction which will dampen and quickly reduce the magnitude of vibrations established in the springs of a motor vehicle seat when the vehicle is operated. The sinuously formed spring strips often employed in motor vehicle seat constructions have a tendency to undergo an extended oscillatory motion when the vehicle passes over uneven surfaces, thereby bouncing the passengers sitting on the seats and contributing to passenger discomfort. By rapidly returning the spring strips to their normal position after they have absorbed the shock of a bump or other uneven contour of a travelled surface, passengers are afforded a much smoother and more enjoyable ride.

It is a further object of the present invention to provide a seat snubber for dampening the oscillating, vibratory action of seat springs which will permit the free and unrestrained downward deflection of the springs under the passenger load, but which will check and retard the upward oscillatory movement of the springs thereby reducing the tendency of the seat construction to pitch or throw passengers from the seat when the vehicle passes over a rough surface. The object is achieved by the incorporation of a clutch member in the snubber mechanism. Such a construction utilizes the full cushioning capacity of the seat springs in softening the impact of a bump or other uneven road contour, inasmuch as the snubber is substantially inoperative during the downward phase of the oscillatory motion of the seat spring. However, during the upward oscillatory movement of the spring, the snubber is operative to retard the spring movement and perform its beneficial dampening function.

It is a further object of the present invention to provide a seat snubber for a vehicular spring seat construction which offers no uneven projection in the seat surface during the downward oscillatory movement of the seat springs. Seat snubbers heretofore in use which are operative during the downward movement of the seat springs, resisting the downward movement of the passengers on the springs, form an uneven projection or bump in the seat surface during the downward compression of the springs, contributing to passenger discomfort.

It is a further object of the present invention to provide a snubber for a spring seat construction which will permit the seat springs to return to their normal position when an occupant's weight is removed therefrom. The springs of the usual vehicle seat when approaching their normal position are not sufficiently bowed to overcome the retarding effect of the snubber. The snubbers heretofore used act to hold the springs in a slightly compressed position, thereby leaving an unsightly depression in the seat.

It is a further object of the present invention to provide a seat snubber for a vehicular spring seat construction which is inexpensive of manufacture, durable of construction, and capable of a long, useful life.

Further objects and advantages of the present invention will become apparent from the following detailed description taken in conjunction with the accompanying drawing, wherein:

Figure 1 is an elevational view with parts broken away of a spring seat construction having a snubber embodying the principles of the present invention;

Fig. 2 is a plan view of the seat snubber, taken along the lines 2—2 of Fig. 1;

Fig. 3 is a cross-sectional view of the snubber, taken along the lines 3—3 of Fig. 1; and Fig. 4 is a sectional view of the structure illustrated in Fig. 3, taken along the lines 4—4 thereof.

Referring to Fig. 1, parallel front and rear rails, 15 and 17 respectively, formed of hollow steel tubing, extend the width of the seat construction and are supported by frame members, one of which is designated by the reference character 19. Longitudinally extending, transversely-spaced spring elements 21 are supported between the rails 15 and 17. The spring elements 21 are made of steel wire bent to a sinuous or corrugated shape forming oppositely disposed loops joined by parallel transversely extending portions, generally indicated at 23. This sinuous type construction readily permits the springs to be stretched and compressed under a passenger load. Each spring is provided with a crown portion, generally indicated at 25, and V-shaped portions, 27 and 29, at the front and rear thereof which are joined by brackets, 31 and 33, to the front and rear rails, 15 and 17. Supported by the frame 19, intermediate the front and rear rails, 15 and 17, is a transverse bar 35.

The seat snubber for dampening the vibrations of the springs is disposed generally in the center of the seat, supported between the rod 35 and one of the transverse portions 23 of the springs 21. As many seat snubbers might be used, transversely spaced across the seat, as there are springs 21. However, excellent results may be obtained by the use of either one or two snubbers supported on separate springs below the driver's position and a like number of snubbers disposed on the opposite side of the seat occupied by a passenger. As is readily apparent, only those springs which are compressed by an occupant's weight need be dampened in order to achieve the desired results; therefore, such an arrangement would accommodate a driver and one passenger in a convenient and feasible manner.

Each snubber is identical and includes an upper arm 37 pivotally secured to one of the transverse spring portions 23 and a lower arm 39 pivotally secured to the rod 35. The arms 37 and 39 are formed of stamped sheet metal and they are pivotally joined at their inner ends, or heads, by a stud 41, with the flat sides of the arms lying on parallel longitudinal planes. The enlarged inner end, or head, of the lower arm 39 is circular in shape and is provided with a circular aperture centrally therethrough. The inner end or head of the upper arm 37, generally indicated at 45, is bent so as to be generally U-shaped with the two parallel legs 47 thereof being provided with aligned circular apertures to receive the stud 41.

Fig. 3 illustrates the manner in which the two arms 37 and 39 are joined together and the arrangement of parts on the stud 41. The shank 49 of the stud 41 is of a D-shaped cross section and is freely rotatable in the circular apertures of the arms 37 and 39. Mounted on the shank 49 adjacent the lower arm 39 is a washer 51 provided with a centrally located D-shaped aperture conforming to the periphery of the shank 49. Interposed between the washer 51 and the enlarged end portion 43 of the lower arm 39 is a disc 53 of any suitable friction material, such as wax-impregnated paper or fabric. Disposed on the other side of the enlarged portion 43 of the lower arm 39 is an identical friction disc 55. Holding the friction disc 55 in compression against the lower arm 39 is a large circular washer 57 provided with a centrally disposed D-shaped aperture conforming to the periphery of the shank 49. It will thus be seen that both of the washers 51 and 57 are keyed to the shank 49 for mutual rotation therewith while the lower arm 39 is free to pivot on the shank 49 and is only held against pivotal movement therewith by its frictional engagement with the friction discs 53 and 55. Forcing the washers 51 and 57, the friction discs 53 and 55, and the enlarged head portion 43 into frictional engagement is a spiral helical spring 59 held in compression by a washer 61 and the head 63 of the stud 41.

Disposed on the shank 49 and extending through the apertures of the upper arm 37 is a sleeve 65 which is secured, as by welding, to the washer 51. Snugly wound around the sleeve 65 between the leg portions 47 of the upper arm 37 is a helical spring 67 forming a clutch element between the upper arm 37 and the sleeve 65. The inner end 69 of the clutch spring 67 is disposed along the side of the upper arm 37 and is secured thereto by being bent inwardly through an aperture 71 provided in said arm 37. As viewed in Fig. 2, the clutch spring 67 is wound on the sleeve 65 toward the upper arm 37 and washer 51 in a counterclockwise direction. Thus, the direction in which the clutch spring 67 is wound towards its fixed end is the same direction in which the upper arm 37 pivots upon the upward movement of the seat spring 21. A C clip 68 is secured on the end of the shank 49 co-operating with the head 63 in maintaining the snubber in assembly.

In the operation of the vehicle the clutch spring 67 alternately engages and disengages upon the upward and downward movement of the spring 21. When the spring 21 oscillates in an upward direction and the upper arm 37 pivots in a counterclockwise direction (as viewed in Fig. 1), the arm 37 tends to wind the clutch spring 67 tightly on the sleeve 65. The binding engagement thus caused between the clutch spring 67 and the sleeve 65 causes the sleeve to turn with the upper arm 37. When the upper arm 37 is clutched to the sleeve 65, the washer 51, secured to the sleeve 65, will be caused to rotate therewith. The washer 51, being keyed to the shank 49, the shank 49 and the washer 57 keyed thereto will also rotate mutually with the upper arm 37, all of which parts pivot with respect to the lower arm 39. The relative pivotal movement between the washers 51 and 57 and the lower arm 39 is retarded by the binding engagement of the friction discs 53 and 55 interposed between the washers 51 and 57 and the enlarged end portion 43 of the lower arm 39. It is this frictional engagement which affords the snubber its dampening function upon the upward movement of the springs 21.

When the seat spring 21 is depressed, the clockwise movement of the upper arm 37 tends to unwind the clutch spring 67 from the sleeve 65, thus permitting the upper arm 37 and clutch spring 67 to freely pivot on the sleeve 65. At the same time the lower arm 39 and washers 51 and 57 operate as a unit and no relative pivotal movement occurs therebetween.

The free end 73 of the clutch spring has secured thereto a chain 75 which is attached to the spring 21. The chain 75 is of such length as to exert no pressure upon the free end 73 of the clutch spring during the major part of the oscillation of the spring 21. However, as the spring 21 approaches its normal position when the passenger load is removed therefrom, the spring 21 is sufficiently remote from the end 73 to exert a pressure on the chain 75, thereby tending to unwind clutch spring 67 and disengage the snubbing operation. At this point the spring 21 is not sufficiently bowed out of its normal position to have sufficient strength to return to its normal position in opposition to the snubber. At the time that the chain 75 releases the clutch, the dampening operation is no longer required. Its disengagement permits the spring 21 to return to its normal position without being retarded by the snubber.

The amount of force exerted by the snubber in resisting the upward movement of the spring 21 may be controlled by the choice of spiral helical spring 59. A spring of greater strength will increase the frictional engagement of the enlarged end 43 and washers 51 and 57. The spring 59 chosen should be of such strength to permit a slow yet steady return of the seat spring 21.

While it will be apparent that the preferred embodiment herein disclosed is well calculated to fulfill the objects above stated, it will be appreciated that the invention is susceptible to modification, variation and change without departing from the proper scope or fair meaning of the subjoined claims.

What is claimed is:

1. A seat snubber for a spring seat construction including an upper arm for pivotal attachment to a seat spring, a lower arm adapted to be pivotally secured below a seat spring, said arms being provided at their adjacent ends with apertures for the reception of a shaft, a shaft disposed in said apertures pivotally connecting said arms, a washer member keyed to said shaft, means forcing one of said arms and said washer into frictional engagement, a unidirectional clutch locking said shaft to the other of said arms in one direction of movement of said arm, and means positively releasing said clutch to permit said one arm to be moved independent of said other arm.

2. A seat snubber for a spring seat construction including an upper arm for pivotal attachment to a seat spring, a lower arm adapted to be pivotally secured below a seat spring, said arms being provided at their adjacent ends with apertures for the reception of a shaft, a shaft disposed in said apertures pivotally connecting said arms, a friction disc disposed on said shaft with one side engaging one of said arms, a washer member keyed to said shaft engaging the other side of said friction disc, means forcing said one arm, said friction disc and said washer into frictional engagement, and a clutch spring wound snugly around said shaft and secured at one end to the other of said arms.

3. A seat snubber for a spring seat construction including an upper arm for pivotal attachment to a seat spring, a lower arm adapted to be pivotally secured below a seat spring, said arms being provided at their adjacent ends with apertures for the reception of a shaft, a shaft disposed in said apertures pivotally connecting said arms, a friction disc disposed on said shaft adjacent one of said arms, a washer member keyed to said shaft on the other side of said friction disc, means forcing said one arm, said friction disc, and said washer into frictional engagement, a sleeve disposed on said shaft and secured to said washer, said sleeve extending through the aperture of the other of said arms, a helical spring wound snugly around said sleeve and secured at one end to said other arm whereby said other arm is clutched to said sleeve upon pivotal movement of said other arm relative to one arm in one direction, said other arm being freely pivotable on said sleeve upon pivotal movement thereof in the other direction.

4. A seat snubber for a spring seat construction including an upper arm for pivotal attachment to a seat spring, a lower arm adapted to be pivotally secured below a seat spring, said arms being pivotally joined by a shaft, a friction disc disposed on said shaft adjacent one of said arms, a washer member keyed to said shaft on the other side of said friction disc, means forcing said one arm, said friction disc and said washer into frictional engagement, said other arm having two spaced supporting portions disposed on said shaft, a helical spring wound snugly on said shaft between said supporting portions, one end of said spring being secured to said other arm.

5. A seat snubber for a spring seat construction including a first arm having a centrally apertured enlarged head portion, a second arm having spaced supporting portions at one end thereof provided with aligned apertures, said arms being pivotally connected by a shaft extending through said apertures, friction means associated with said shaft engaging the enlarged head portion of said first arm operative to retard pivotal movement of said first arm on said shaft, a helical clutch spring mounted on said shaft adjacent said second arm and secured at one end to said second arm, and releasing means on the other end of said clutch spring permitting said one arm to be moved independently of said other arm.

References Cited in the file of this patent

UNITED STATES PATENTS

| 1,275,177 | Tverdahl | Aug. 6, 1918 |
| 1,679,179 | Starkey | July 31, 1928 |
| 1,810,872 | Lord | June 16, 1931 |
| 2,633,903 | Tsang | Apr. 7, 1953 |

FOREIGN PATENTS

| 209,755 | Great Britain | 1925 |